US012747961B2

(12) United States Patent
Kwak et al.

(10) Patent No.: US 12,747,961 B2
(45) Date of Patent: Sep. 29, 2026

(54) METHOD OF GENERATING SCORE MAP, METHOD OF CONTROLLING DRIVING, AND SYSTEM OF CONTROLLING DRIVING FOR MOBILITY

(71) Applicants: Hyundai Motor Company, Seoul (KR); Kia Corporation, Seoul (KR)

(72) Inventors: Dong Hwan Kwak, Hwaseong-si (KR); Sanghyeon Oh, Hwaseong-si (KR); Hyuntek Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 122 days.

(21) Appl. No.: 18/789,243

(22) Filed: Jul. 30, 2024

(65) Prior Publication Data

US 2025/0216218 A1 Jul. 3, 2025

(30) Foreign Application Priority Data

Dec. 27, 2023 (KR) ........................ 10-2023-0193421

(51) Int. Cl.
*G01C 21/00* (2006.01)
*G01S 7/4865* (2020.01)
*G01S 17/894* (2020.01)

(52) U.S. Cl.
CPC ..... *G01C 21/3826* (2020.08); *G01C 21/3837* (2020.08); *G01S 7/4865* (2013.01); *G01S 17/894* (2020.01)

(58) Field of Classification Search
CPC ............ G01C 21/3826; G01C 21/3837; G01S 17/894; G01S 7/4865
See application file for complete search history.

(56) References Cited

U.S. PATENT DOCUMENTS

| | | | | |
|---|---|---|---|---|
| 2007/0156286 | A1* | 7/2007 | Yamauchi | G05D 1/024 700/245 |
| 2017/0057495 | A1* | 3/2017 | Walessa | G01S 17/89 |
| 2017/0166204 | A1 | 6/2017 | Yoo et al. | |
| 2020/0200547 | A1* | 6/2020 | Miller | G01C 21/3874 |
| 2021/0188296 | A1* | 6/2021 | Ma | B60W 40/13 |
| 2022/0374024 | A1* | 11/2022 | Whitman | G05D 1/242 |

FOREIGN PATENT DOCUMENTS

KR 101714273 B1 3/2017

* cited by examiner

*Primary Examiner* — Navid Z. Mehdizadeh
*Assistant Examiner* — Oliver Tan
(74) *Attorney, Agent, or Firm* — Slater Matsil, LLP

(57) ABSTRACT

A method of generating a score map for a mobility can include loading, by a controller of the mobility, a local map including a plurality of cells, scanning, by a surrounding environment scanning unit mounted on the mobility, a surrounding environment of the mobility, recognizing, by the controller, a surrounding terrain of the mobility from information on the surrounding environment of the mobility, generating, by the controller, a first score map corresponding to the terrain, generating, by the controller, a vector map corresponding to the terrain, converting, by the controller, the vector map to a second score map, and generating, by the controller, a final score map based on the first score map and the second score map. A method can further include controlling driving for a mobility. A system of controlling driving of a mobility by using the final score map is also disclosed.

20 Claims, 10 Drawing Sheets

METHOD OF GENERATING SCORE MAP, METHOD OF CONTROLLING DRIVING, AND SYSTEM OF CONTROLLING DRIVING FOR MOBILITY

CROSS-REFERENCE TO RELATED APPLICATIONS

This application claims priority to and the benefit of Korean Patent Application No. 10-2023-0193421 filed in the Korean Intellectual Property Office on Dec. 27, 2023, the entire contents of which are incorporated herein by reference.

TECHNICAL FIELD

The present disclosure relates to a method of generating a score map and controlling driving for a mobility.

BACKGROUND

In general, an autonomous driving mobility may perform a driving route plan by planning a possible movement of the mobility on a vector map or a two-dimensional (2D) map. The mobility may plan the driving route based on a 2D light detection and ranging sensor (LiDAR) or a three-dimensional (3D) LiDAR. In a stable indoor environment, the mobility may plan a sufficiently safe driving route by using only the 2D LiDAR, and drive based on the planned driving route without an accident.

However, when driving outdoors by using a 2D LiDAR-based driving route plan, the mobility may recognize a terrain that the mobility can drive as an obstacle, or may not recognize a terrain that the mobility is incapable of driving as the obstacle.

The above information disclosed in this Background section is provided only to assist in more understanding of the background of the present disclosure, and may thus include information not included in the prior art already publicly known, available, or in use.

SUMMARY

The present disclosure relates to a method of generating a score map, a method of controlling driving for a mobility, and a system of controlling driving for a mobility, and more particularly, to a method of generating a score map that may generate a final score map by merging a vector map based on a terrain with the score map corresponding to a surrounding environment, and a method of controlling driving for a mobility, and a system of controlling driving for a mobility, which may generate a driving route by using the final score map and control the driving of the mobility.

An embodiment of the present disclosure can provide a method of generating a score map for a mobility that may generate a final score map by merging a vector map based on a terrain with a score map corresponding to a surrounding environment.

An embodiment of the present disclosure can provide a method of controlling driving for a mobility and a system of controlling driving for a mobility, which may generate a driving route by using the final score map and control the driving of the mobility based on the driving route.

According to an embodiment of the present disclosure, a method of generating a score map for a mobility can include: loading, by a controller of the mobility, a local map including a plurality of cells; scanning, by a surrounding environment scanning unit mounted on the mobility, a surrounding environment of the mobility; recognizing, by the controller, a surrounding terrain of the mobility from information on the surrounding environment of the mobility; generating, by the controller, a first score map corresponding to the terrain; generating, by the controller, a vector map corresponding to the terrain; converting, by the controller, the vector map to a second score map; and generating, by the controller, a final score map based on the first score map and the second score map.

The terrain may include an obstacle defined as any object physically existing between bottom and top surfaces of the mobility, a general terrain defined as a terrain having all surfaces existing between the bottom surface of the mobility and a lower end of a wheel of the mobility, and a special terrain defined as a terrain where the mobility is capable of moving based on an entry direction or a speed of the mobility.

The vector map may include the plurality of cells and a plurality of vectors each heading from each of the plurality of cells to the surrounding cell, each cell storing a terrain type and each vector storing maximum and minimum speeds of the mobility when the mobility moves in a direction of the vector.

The generating a vector map corresponding to the terrain may include collecting performance information of the mobility, calculating the vector map of the surrounding terrain of the obstacle, calculating the vector map of the special terrain, and calculating the vector map of the general terrain.

The converting the vector map to a second score map may include assigning the score based on the obstacle terrain, assigning the score based on the maximum speed, and assigning the score based on the special terrain.

In the assigning the score based on the obstacle terrain, the score indicating movement prohibition may be assigned to the cell including the obstacle, and the score may be assigned to the surrounding cell in inverse proportion to a distance to the obstacle.

In the assigning the score based on the maximum speed, the score may be assigned based on a rate of the maximum speed limited.

The generating a final score map based on the first score map and the second score map may include setting a maximum value among at least one score assigned to any cell as a final score of the corresponding cell, and setting a maximum value among at least one score assigned to any vector as a final score of the corresponding vector.

According to an embodiment of the present disclosure, a method of controlling driving for a mobility can include: generating a score map by the method of generating the score map for the mobility described above; generating, by the controller, a driving route based on the score map; generating, by the controller, a driving instruction based on the driving route; and controlling, by the controller, the driving of the mobility based on the generated driving instruction.

The generating the driving route may include generating at least one route from a current location of the mobility to a destination, removing an inappropriate route including a zone where an obstacle is located or a movement of the mobility is prohibited from the at least one route, and selecting, as the driving route, the route having a minimum score among the at least one route from which the inappropriate route is removed.

The driving instruction may include a speed instruction and a torque instruction.

According to an embodiment of the present disclosure, a system of controlling driving for a mobility can include: a mobility; a surrounding environment scanning unit mounted on the mobility and configured to scan a surrounding environment of the mobility; and a controller configured to load a local map including a plurality of cells, receive information on the scanned surrounding environment from the surrounding environment scanning unit, recognize a surrounding terrain of the mobility from the information on the surrounding environment, generate a first score map corresponding to the recognized terrain, generate a vector map corresponding to the recognized terrain, convert the generated vector map to a second score map, generate a final score map based on the first score map and the second score map, generate a driving route based on the final score map, and control the driving of the mobility based on the driving route.

The terrain may include an obstacle defined as any object physically existing between bottom and top surfaces of the mobility, a general terrain defined as a terrain having all surfaces existing between the bottom surface of the mobility and a lower end of a wheel of the mobility, and a special terrain defined as a terrain where the mobility is capable of moving based on an entry direction or a speed of the mobility.

The vector map may include the plurality of cells and a plurality of vectors each heading from each of the plurality of cells to the surrounding cell, each cell storing a terrain type and each vector storing the maximum and minimum speeds of the mobility when the mobility moves in a direction of the vector.

When generating the vector map based on the terrain, the controller may be configured to collect performance information of the mobility, calculate the vector map of the surrounding terrain of the obstacle based on an obstacle type, calculate the vector map of the special terrain based on a special terrain type and the performance information of the mobility, and calculate the vector map of the general terrain based on a general terrain type and the performance information of the mobility.

When converting the vector map to the second score map, the controller may be configured to assign a score based on the obstacle terrain, assign a score based on the maximum speed, and assign a score based on the special terrain.

The controller may be configured to assign the score based on the obstacle terrain by assigning the score indicating movement prohibition to the cell including the obstacle and assigning the score to the surrounding cell in inverse proportion to a distance to the obstacle.

The controller may be configured to assign the score based on the maximum speed by assigning the score based on a rate of the maximum speed limited.

When generating the final score map based on the first score map and the second score map, the controller may be configured to set a maximum value among at least one score assigned to any cell as a final score of the corresponding cell, and set a maximum value among at least one score assigned to any vector as a final score of the corresponding vector.

When generating the driving route, the controller may be configured to generate at least one route from a current location of the mobility to a destination, remove an inappropriate route including a zone where an obstacle is located or a movement of the mobility is prohibited from the at least one route, and select, as the driving route, the route having a minimum score among the at least one route from which the inappropriate route is removed.

When controlling the driving of the mobility based on the driving route, the controller may be configured to generate a driving instruction based on the driving route, and control the driving of the mobility based on the generated driving instruction.

The driving instruction may include a speed instruction and a torque instruction.

According to an embodiment of the present disclosure, even the terrain that the 2D LiDAR is incapable of recognizing as the dangerous zone can be recognized as the terrain where accidents may occur, thereby improving the safety of the mobility.

Even the zone that was previously classified as the dangerous zone but can be conditionally moved by the mobility may also be generated as the driving route under the preset standard.

The stability of the driving route generation in the outdoor driving may be improved by using the LiDAR and the camera which were previously used in the indoor driving without any additional sensor.

The lifespan of the mobility may be improved by primarily avoiding the zone that is likely to damage the hardware of the mobility.

Other advantages that may be acquired or predicted by the embodiments of the present disclosure are disclosed directly or implicitly in the detailed description of the example embodiments of the present disclosure. That is, various effects predicted based on the example embodiments of the present disclosure are disclosed in the detailed description described below.

BRIEF DESCRIPTION OF THE DRAWINGS

Embodiments in the specification may be better understood by referring to the following description in connection with the accompanying drawings in which like reference numerals refer to identical or functionally similar elements.

Figure 1:
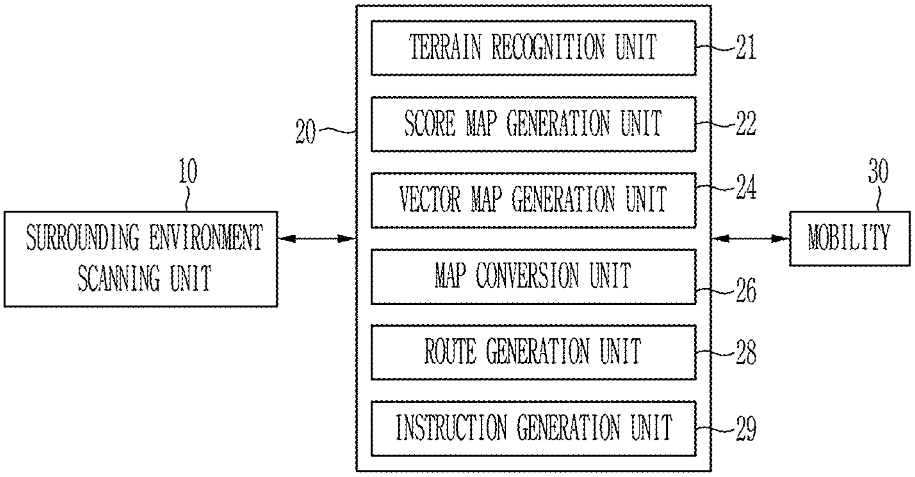
FIG. 1 is a block diagram of a system of controlling driving for a mobility according to an embodiment of the present disclosure.

It can be understood that the drawings referenced above are not necessarily drawn to scale, and present a rather simplified representation of various features illustrating basic principles in example embodiments of the present disclosure. For example, specific design features of example embodiments of the present disclosure, including a specific dimension, orientation, position, and shape, can be determined in part by the particularly intended application and environment of use.

DETAILED DESCRIPTION OF ILLUSTRATIVE EMBODIMENTS

A term used herein can be only to describe a specific embodiment, and is not necessarily intended to limit the present disclosure. A term of a singular number used herein can include its plural number unless the context clearly indicates otherwise. It can also be understood that the terms "include" and/or "including", when used in the specification, specify the presence of the recited features, integers, steps, operations, elements and/or components, and do not exclude the presence or addition of one or more of other features, integers, steps, operations, elements, components and/or groups thereof. A term "and/or" used herein includes any one or all combinations of the associated listed items.

"A mobility", "of a mobility", or other similar terms used in the specification may generally include a general land mobility including a passenger vehicle, a sport utility vehicle (SUV), a bus, a truck, a tractor, various commercial vehicles, or the like, include a marine mobility including various boats and ships, include an aerial mobility including an aircraft, a drone, or the like, and include any object that may be moved by receiving power from a power source. In addition, the "mobility", "of the mobility", or other similar terms used herein may be understood to include a hybrid mobility, an electric mobility, a plug-in hybrid mobility, a hydrogen-powered mobility, and another alternative fuel (e.g., fuel derived from a source other than petroleum) mobility. As mentioned herein, the hybrid mobility is a mobility having two or more power sources, for example, a gasoline-powered and electric-powered mobility. A mobility according to the embodiments of the present disclosure may include a manually driven mobility as well as a mobility driven more or less autonomously and/or automatically.

Further, it is to be understood that one or more of methods described below or aspects thereof may be executed by at least one or more controllers. The term "controller" may refer to a hardware device including a memory and a processor, either or both of which may be in plural or may include plural components thereof, together or separated. The memory may store program instructions, and the processor may be specifically programmed to execute the program instructions to perform one or more processes described below in more detail. The controller may control operations of units, modules, parts, devices, or the like, as described herein. It is also to be understood that the methods described below may be executed by an apparatus including the controller in conjunction with one or more other components, as appreciated by those skilled in the art.

In addition, the controller of the present disclosure may be implemented as a non-transitory computer-readable recording medium including executable program instructions executed by the processor. An example of the computer-readable recording medium may include a read only memory (ROM), a random access memory (RAM), a compact disk read only memory (CD-ROM), a magnetic tape, a floppy disk, a flash drive, a smart card, an optical data storage device, or any combination thereof, and the present disclosure is not limited thereto. The computer-readable recording medium may also be distributed throughout a computer network, storage network, distributed ledger, or blockchain network, and the program instructions may thus be stored and executed in a distributed manner using, for example, a telematics server or a controller area network (CAN).

Hereinafter, example embodiments of the present disclosure are described in detail with reference to the accompanying drawings.

FIG. 1 is a block diagram of a system of controlling driving for a mobility according to an embodiment of the present disclosure.

As shown in FIG. 1, the system of controlling driving for a mobility according to an embodiment of the present disclosure may include a surrounding environment scanning unit 10, a controller 20, and a mobility 30, any combination of or all of which may be in plural or may include plural components thereof.

The surrounding environment scanning unit 10 may be mounted on the mobility 30 and configured to scan a surrounding environment of the mobility 30. The surrounding environment scanning unit 10 may include a light detection and ranging sensor (LiDAR) and a camera.

The LiDAR may emit a laser pulse to a vicinity of the mobility 30 and then detect a return time of the laser pulse reflected from a terrain (e.g., an obstacle, a general terrain, or a special terrain) within a LiDAR detection range, thereby detecting information on the terrain, such as a distance from the LiDAR to the terrain, direction, speed, temperature, material distribution, concentration feature of the terrain, or the like. The LiDAR may be connected to the controller 20 to detect two-dimensional (2D) LiDAR point data (e.g., 2D data of a plurality of LiDAR points) within the detection range, and transmit the 2D LiDAR point data to the controller 20. However, the LiDAR is not limited to the LiDAR detecting the 2D LiDAR point data, and may include a LiDAR detecting three-dimensional (3D) LiDAR point data.

The camera may scan a surrounding image of the mobility 30 within a detection range of the camera. The camera may be connected to the controller 20 and transmit the scanned image to the controller 20. The image may include pixel data including a plurality of pixels. The type of camera is not particularly limited to any type as long as the camera can scan the surrounding image from which a surrounding terrain of the mobility 30 can be recognized.

The controller 20 may include a terrain recognition unit 21, a score map generation unit 22, a vector map generation unit 24, a map conversion unit 26, a route generation unit 28, and an instruction generation unit 29, any combination of or all of which may be in plural or may include plural components thereof.

The terrain recognition unit 21 may receive information on the surrounding environment scanned by the surrounding environment scanning unit 10, and recognize the terrain from the information on the surrounding environment. For example, the terrain recognition unit 21 may receive the 2D LiDAR point data from the LiDAR, and the surrounding image of the mobility 30 from the camera. The terrain recognition unit 21 may recognize the surrounding terrain of the mobility 30 from the 2D LiDAR point data and the surrounding image of the mobility 30. For this purpose, the terrain recognition unit 21 may store an algorithm for recognizing a feature point of the image. The terrain may be classified as the obstacle, the general terrain, or the special terrain.

The obstacle refers to a terrain that is likely to collide with the mobility 30, such as a person, another mobility, or a thing. The obstacle may be defined as any object physically existing between bottom and top surfaces of the mobility 30 recognized by the terrain recognition unit 21.

The general terrain refers to a terrain where a difference between the maximum and minimum heights is less than a preset value so that the terrain is treated as a flat surface. The general terrain may be defined as a terrain having all surfaces existing between the bottom surface of the mobility 30 and a lower end of a wheel of the mobility.

Figure 8:
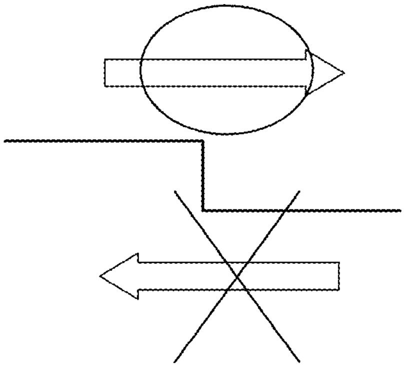
FIG. 8 shows an example of a special terrain.
Figure 9:
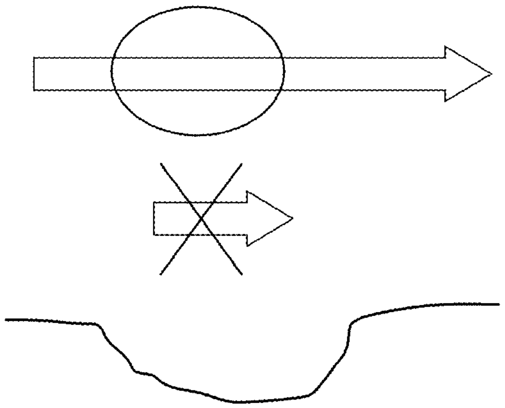
FIG. 9 shows another example of a special terrain.

The special terrain refers to a terrain where the mobility 30 can move depending on an entry direction or a speed of the mobility. For example, as shown in FIG. 8, a road curb may correspond to the special terrain where the mobility 30 can move in a direction of decreasing height, but cannot move in a direction of increasing height. As shown in FIG. 9, a puddle or dip may correspond to the special terrain where the mobility 30 can pass at a high speed, but cannot pass at a low speed.

Figure 6:
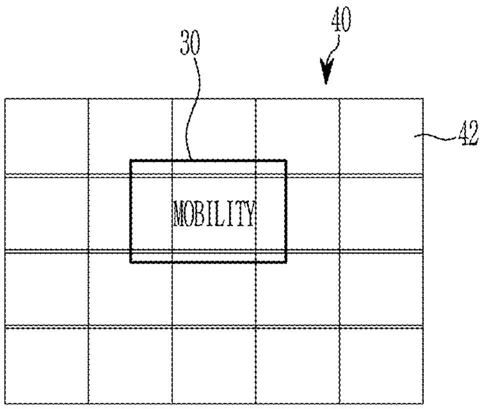
FIG. 6 shows an example of a surrounding local map of the mobility.

The score map generation unit 22 may receive the information on the recognized terrain from the terrain recognition unit 21, and generate a numerical score map based on the information on the terrain so that each region of the map can be used for another calculation. For example, the score map may be used as a cost map for calculating a cost for driving a route, or as a feature map scoring a terrain feature. For example, as shown in FIG. 6, a surrounding local map 40 of the mobility 30 may include a plurality of cells 42 divided in a grid form, and each cell 42 may store location information and score information of the corresponding cell 42. The score map generation unit 22 may recognize the cell 42 where the terrain is located based on the information on the terrain, and generate a first score map by assigning a score corresponding to the terrain to the corresponding cell 42.

Figure 7:
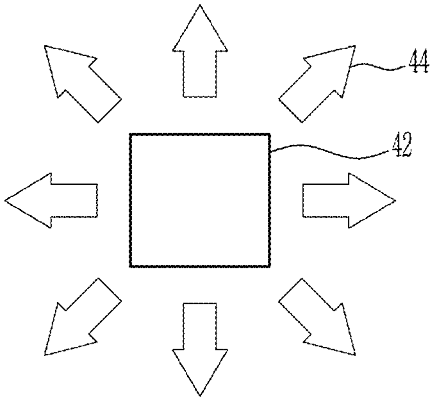
FIG. 7 shows an example of information input to a vector map.

The vector map generation unit 24 may receive the information on the recognized terrain from the terrain recognition unit 21, and generate a vector map based on the information on the terrain. For example, as shown in FIG. 7, the vector map may include at least one cell 42 and eight vectors 44 heading from the corresponding cell 42 to the surrounding cells 42. Each cell 42 may store a terrain type, and each vector 44 may store maximum and minimum speeds of the mobility 30 when the mobility 30 is moved in a direction of the vector 44. Accordingly, the vector map generation unit 24 may input the terrain type to each cell 42 based on the terrain type and a relative location of the cell and the terrain, and input the maximum and minimum speeds into the vector 44 included in the corresponding cell 42, thereby generating the vector map.

The map conversion unit 26 may receive the vector map from the vector map generation unit 24 and convert the vector map to a second score map based on a preset rule. The second score map may include a score of each cell 42 and a score of the vector 44 heading from the corresponding cell 42 to the surrounding cell 42.

In addition, the map conversion unit 26 may generate a final score map by merging the first score map with the second score map. The plurality of scores may be assigned to the cell 42 or the vector 44. In this case, the maximum value among the plurality of scores may be a final score of the cell 42 or that of the vector 44. Accordingly, the final score map may include the final score of each cell 42 and the final scores of the eight vectors 44 each heading from the corresponding cell 42 to the surrounding cell 42. As described above, the final score map may be used as the cost map for calculating the cost for driving the route or as the feature map scoring the terrain feature. However, the final score map is not limited to an embodiment described herein, and may be used in various applications that require a map including numerical regions.

The route generation unit 28 may generate a plurality of routes from a current location of the mobility 30 to a destination, calculate the score for each of the plurality of routes, and select the route having the minimum score as a driving route. A logic for generating the driving route of the mobility 30 may be well known to those skilled in the art, and may be stored in a memory of the controller 20.

The instruction generation unit 29 may generate a driving instruction for moving the driving route. The driving instruction may include a speed instruction and a torque instruction. The instruction generation unit 29 may further perform a driving control of the mobility 30 based on the driving instruction.

For this purpose, the controller 20 may be equipped with one or more microprocessors, and one or more microprocessors may be programmed to perform each operation of the method of controlling driving for a mobility according to an embodiment of the present disclosure.

The mobility 30 may be controlled to move along the route generated by the route generation unit 28 based on the instruction generated by the instruction generation unit 29. The mobility 30 may include at least one wheel and at least one drive motor rotating the at least one wheel. An operation of the drive motor may be controlled based on the speed instruction and the torque instruction.

Figure 2:
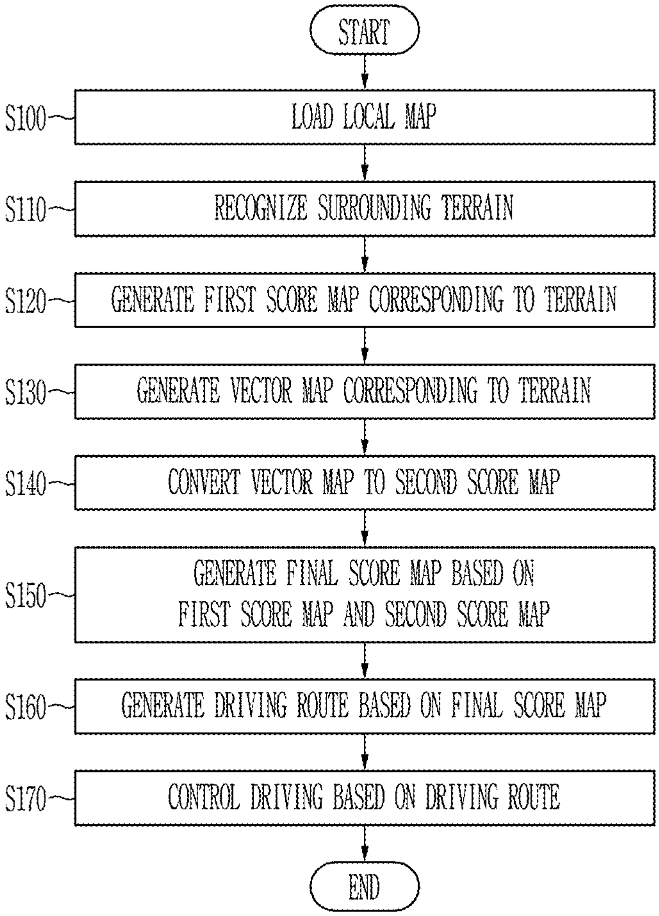
FIG. 2 is a flowchart of a method of controlling driving for a mobility according to an embodiment of the present disclosure.
Figure 3:
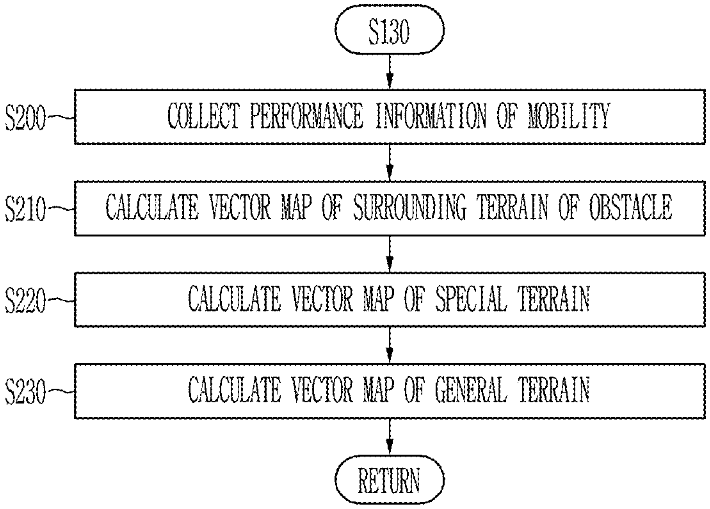
FIG. 3 is a flowchart of operation S130 in FIG. 2.
Figure 4:
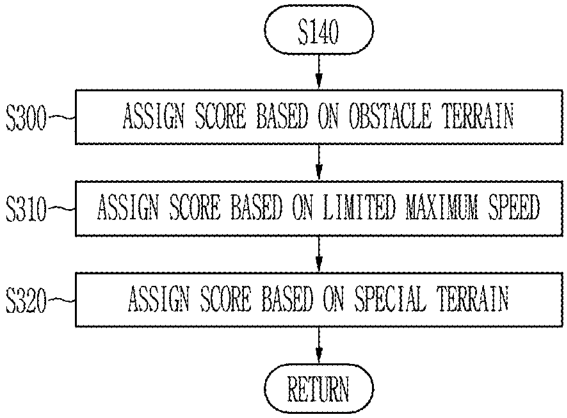
FIG. 4 is a flowchart of operation S140 in FIG. 2.
Figure 5:
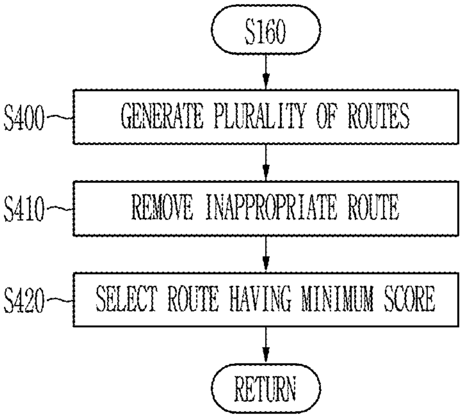
FIG. 5 is a flowchart of operation S160 in FIG. 2.

FIG. 2 is a flowchart of a method of controlling driving for a mobility according to an embodiment of the present disclosure. FIG. 3 is a flowchart of operation S130 in FIG. 2. FIG. 4 is a flowchart of operation S140 in FIG. 2. FIG. 5 is a flowchart of operation S160 in FIG. 2.

As shown in FIG. 2, a method of controlling driving for a mobility according to an embodiment of the present disclosure may begin by starting the mobility 30. For example, a user may press a start button of the mobility 30 or turn on the mobility 30 by using a remote control device.

The mobility 30 may receive the destination or the like from the user, and a controller 20 may load a local map 40 from an entire map stored in the memory at operation S100. The local map 40 may be a map of a region within a preset range centered on the mobility 30. As shown in FIG. 6, the local map 40 may include the plurality of cells 42 divided in the grid form, and each cell 42 may store the location information of the corresponding cell 42 (e.g., center coordinates of each cell 42 or a size of each cell 42).

When the local map 40 is loaded, the surrounding environment scanning unit 10 may scan the surrounding environment of the mobility 30. For example, the light detection and ranging sensor (LiDAR) may detect the two-dimensional (2D) LiDAR point data (e.g., the 2D data of the plurality of LiDAR points) within the detection range of the LiDAR, and scan the surrounding image of the mobility 30 within the detection range of the camera. In addition, the surrounding environment scanning unit 10 may transmit the 2D LiDAR point data and the surrounding image of the mobility 30 to the controller 20.

The terrain recognition unit 21 of the controller 20 may recognize the surrounding terrain of the mobility 30 from the information on the surrounding environment when the information on the scanned surrounding environment is received from the surrounding environment scanning unit 10 at operation S110. The terrain may be classified as the obstacle, the general terrain, or the special terrain.

The score map generation unit 22 of the controller 20 may receive the information on the terrain (e.g., the terrain type or the location of the terrain) from the terrain recognition unit 21, and generate the first score map corresponding to the terrain based on the information on the terrain and the location information of the cell 42, when the terrain recognition unit 21 recognizes the surrounding terrain of the mobility 30 at operation S120. The first score map may be generated by assigning the score corresponding to each terrain to each of the plurality of cells. For example, the score ranging from zero to 255 may be assigned to each cell 42. The score of 255 may be the score assigned to the cell 42 that is reserved due to lack of sufficient information, the score of 254 may be the score assigned to the cell 42 that has the obstacle capable of causing a collision, the score ranging from 128 to 253 may be the score assigned to the cell 42 where the collision is likely to occur and assigned based on a distance from the obstacle or the special terrain, the score ranging from 1 to 127 may be the score assigned to the cell 42 that has no possibility of the collision with the obstacle and assigned based on difficulty (e.g., a width of a drivable road, an impact applied to the mobility 30 when moving on the drivable road, etc.), power consumption (e.g., a slope of the drivable road, etc.), or the like, when the mobility 30 moves to the corresponding cell 42. The score of zero may be the score assigned to a free space. However, it can be appreciated that the scores described above are not restrictive but are only examples.

When the terrain recognition unit 21 recognizes the surrounding terrain of the mobility 30, the vector map generation unit 24 of the controller 20 may receive the information on the terrain (e.g., the terrain type or the location of the terrain) from the terrain recognition unit 21, and generate the vector map corresponding to the terrain based on the information on the terrain, the location information of the cell 42, and the direction of the vector 44 at operation S130.

The operation S130 is described in more detail with reference to FIG. 3.

Referring to FIG. 3, the operation S130 begins by collecting performance information of the mobility 30 at operation S200. The performance information of the mobility 30 may include the maximum speed of the mobility 30, a drivable terrain type, the maximum speed of the mobility 30 based on the terrain type, a condition for the mobility 30 to pass through the special terrain, or the like, but the performance information is not necessarily limited thereto. For example, a performance condition of the mobility 30 can be as follows:

- The mobility 30 can climb the road curb having a height up to 10 cm at a predetermined/preset speed or more, and vertically climb the road curb having a height up to 13 cm at the maximum speed;
- The mobility 30 cannot move when one wheel falls into a groove by 5 cm or more;
- The mobility 30 cannot pass through a sandy terrain; and
- The mobility 30 can pass through an asphalt terrain at the maximum speed, pass through a sidewalk block terrain at (0.8*the maximum speed), and pass through a soil terrain at (0.6*the maximum speed).

The performance information of the mobility 30 may be pre-stored in the memory of the controller 20, and the controller 20 may read the performance information of the mobility 30 that is stored in the memory.

The vector map generation unit 24 of the controller 20 may calculate the vector map of the surrounding terrain of the obstacle at operation S210 when the controller 20 collects the performance information of the mobility 30. For example, the obstacle may be the terrain recognized by the terrain recognition unit 21. In this case, the vector map generation unit 24 may input an obstacle type to the cell 42 including the obstacle, input the maximum speed of zero to the vector 44 of the surrounding cell 42 toward the cell 42 including the obstacle, and input, based on the distance from the cell 42 including the obstacle, the maximum speed inversely proportional to the distance to the vector of the cell 42 toward the cell 42 including the obstacle. In this case, a value of the maximum speed or less may be input as the minimum speed of each vector 44 based on a predetermined/preset rule.

The vector map generation unit 24 of the controller 20 may then calculate the vector map of the special terrain at operation S220. For example, the terrain recognized by the terrain recognition unit 21 may be the special terrain. In this case, the vector map generation unit 24 may input a special terrain type into the cell 42 including the special terrain and collectively input the maximum and minimum speeds to the vector 44 based on the special terrain type and the performance information of the mobility 30. For example, information that the terrain is a curb may be stored in the cell 42 including the curb, the maximum and minimum speeds may be input without modification to the vector 44 including the curb or the vector 44 in a direction of descending the curb from the surrounding cell 42 of the curb, and the maximum and minimum speeds of zero may be input to the vector 44 in a direction of ascending the curb. In addition, information that the terrain is a puddle or dip may be stored in the cell 42 including the puddle/dip through which the mobility 30 can pass only at a predetermined/preset speed or more, and the predetermined/preset speed may be input as the minimum speed to the vector toward the cell 42 including the puddle/dip in the surrounding cell 42 of the cell 42 including the puddle/dip.

The vector map generation unit 24 of the controller 20 may then calculate the vector map of the general terrain at operation S230. For example, the terrain recognized by the terrain recognition unit 21 may be the general terrain. In this case, the vector map generation unit 24 may collectively input the maximum and minimum speeds based on a general terrain type and the performance information of the mobility 30. For example, information that the terrain is asphalt may be stored in the cell 42 including the asphalt, and the maximum speed may be input without modification to the vector 44 toward the cell 42 including the asphalt. In addition, information that the terrain is a water surface or a sand zone may be stored in the cell 42 including the water surface or the sand zone, and the maximum speed of zero may be input to the vector 44 toward the cell 42 including the water surface or the sand zone. In addition, information that the terrain is a sidewalk block may be stored in the cell 42 including the sidewalk block, and (0.8*the maximum speed) may be input as the maximum speed to the vector 44 toward the cell 42 including the sidewalk block. In addition, information that the terrain is soil may be stored in the cell 42 including the soil, and (0.6*maximum speed) may be input as the maximum speed to the vector 44 toward the cell 42 including the soil.

FIG. 3 shows that the operations S200 to S230 are sequentially performed, for example. However, it can be understood that the present disclosure is not particularly limited to this order, and some operations may be performed in parallel.

Referring back to FIG. 2, when the vector map corresponding to the terrain is generated at the operation S130, the map conversion unit 26 of the controller 20 may receive the vector map from the vector map generation unit 24 and convert the vector map to the second score map based on the preset rule at operation S140.

The operation S140 is described in more detail with reference to FIG. 4.

Referring to FIG. 4, at the operation S140, the map conversion unit 26 of the controller 20 may first assign the score based on the obstacle terrain at operation S300. For example, the map conversion unit 26 may assign the score of 254 to the cell 42 including the obstacle, or assign the score ranging from zero to 253 to the surrounding cell 42 in inverse proportion to the distance to the obstacle.

The map conversion unit 26 of the controller 20 may assign the score based on the maximum speed when the score is assigned based on the obstacle terrain at operation S310. In an example, the map conversion unit 26 may assign a high score to the vector 44 whose maximum speed is limited. For example, the map conversion unit 26 may assign the score of zero to the vector 44 whose maximum speed is not limited, assign the score of 254 to the vector 44 into which zero is input as the maximum speed, or assign a score acquired by multiplying a limited rate by 128 to the vector 44 whose maximum speed is limited to the limited rate. In addition, the map conversion unit 26 may assign the score to the surrounding vector 44 of the vector 44 whose maximum speed is limited based on the distance from the corresponding vector 44.

The map conversion unit 26 of the controller 20 may assign the score based on the special terrain at operation S320 when the score is assigned based on the maximum speed. In an example, the map conversion unit 26 may assign a high score for the terrain that may adversely affect the lifespan of the mobility 30. For example, the map conversion unit 26 may assign to the curb a value acquired by adding 128 to a default value of the curb terrain as the score, or assign to a pit or dip a value acquired by adding 64 to a default value of a pit terrain as the score.

FIG. 4 shows that the operations S300 to S320 are sequentially performed. However, it is to be understood that the present disclosure is not particularly limited to this order, and some operations may be performed in parallel.

Referring back to FIG. 2, the controller 20 may generate the final score map based on the first score map and the second score map at operation S150 when the vector map is converted to the second score map at the operation S140. As described above, the plurality of scores may be assigned to the cell 42 or the vector 44. In this case, the controller 20 may set the maximum value among the plurality of scores assigned to any cell 42 as the final score of the corresponding cell 42, and set the maximum value among the plurality of scores assigned to any vector 44 as the final score of the corresponding vector 44.

Figure 10:
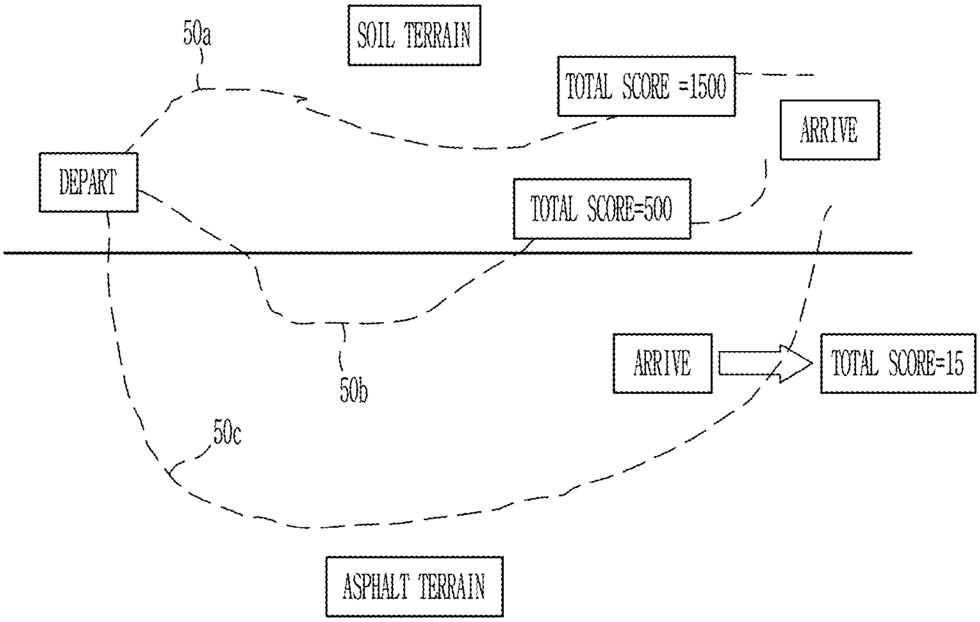
FIG. 10 shows an example of generating a driving route based on a final score map.

The route generation unit 28 of the controller 20 may generate the driving route of the mobility 30 based on the final score map at operation S160 when the final score map is generated at the operation S150. Referring FIG. 5, the route generation unit 28 of the controller 20 may generate the plurality of routes to the destination of the mobility 30 based on the current location and the destination location at operation S400. For example, as shown in FIG. 10, the route generation unit 28 may generate three routes 50*a*, 50*b*, and 50*c* from a departure point (corresponding to the current location of the mobility 30) to an arrival point (corresponding to the destination of the mobility 30).

The route generation unit 28 of the controller 20 may remove an inappropriate route from the plurality of routes at operation S410 when the plurality of routes is generated. For example, the controller 20 may determine that the route is the inappropriate route when the route includes the cell 42 or the vector 44 that includes the obstacle or the score of 254 indicating movement prohibition, and remove the corresponding route from the plurality of routes.

The route generation unit 28 of the controller 20 may calculate the score of the corresponding route by adding up the scores of the cell 42 and the vector 44 included in the respective routes, when or after the inappropriate route is removed from the plurality of routes. The route generation unit 28 of the controller 20 may select the route having the minimum score as the driving route at operation S420 when the scores of all the routes are calculated in this way. For example, as shown in FIG. 10, the first route 50*a* may include only the soil terrain and have 1500 as a total score, the second route 50*b* may include both the soil terrain and the asphalt terrain and have 500 as the total score, and the third route 50*c* may include only in the asphalt terrain and have 15 as the total score. Accordingly, the route generation unit 28 of the controller 20 may select the third route 50*c* having the minimum score of the route as the driving route.

Referring back to FIG. 2, the instruction generation unit 29 of the controller 20 may receive the driving route from the route generation unit 28, generate a driving instruction for the mobility to drive along the generated driving route, and control the driving of the mobility 30 based on the generated driving instruction at operation S170 when or after the driving route is generated at the operation S160. The driving instruction may include a speed instruction and a torque instruction. Accordingly, a drive motor included in the mobility 30 may be controlled based on the speed instruction and the torque instruction.

Although example embodiments of the present disclosure have been described hereinabove, scopes of the present disclosure are not necessarily limited thereto, and all equivalent modifications easily modified by those skilled in the art to which the present disclosure pertains are intended to fall within scopes and spirit of the present disclosure.

What is claimed is:

1. A method of generating a score map controlling driving for a mobility, the method comprising:

loading a local map including a first plurality of cells;

scanning, using a surrounding environment scanning unit that comprises a light detection and ranging sensor (LiDAR) and a camera, a surrounding environment of the mobility;

recognizing a surrounding terrain of the mobility from information scanned, by the surrounding environment scanning unit, on the surrounding environment of the mobility;

generating a first score map that assigns a score to each corresponding terrain based on the surrounding terrain that is recognized from the information scanned by the surrounding environment scanning unit;

generating a vector map based on the surrounding terrain that includes a second plurality of cells that each correspond to one of the first plurality of cells and a plurality of vectors each heading from each of the second plurality of cells to a surrounding cell, each cell storing a terrain type and each vector storing maximum and minimum speeds of the mobility when the mobility moves in a direction of the vector;

converting the vector map generated based on the surrounding terrain to a second score map based on a preset rule;

generating a final score map, based on the first score map and the second score map, that includes cell-level terrain scores of the first score map and direction-dependent vector-level speed scores of the second score map; and controlling the driving of the mobility based on the generated final score map.

2. The method of claim 1, wherein the surrounding terrain includes:

an obstacle, wherein the obstacle includes an object physically existing between a bottom surface of the mobility and a top surface of the mobility;

a general terrain includes terrain surfaces existing between the bottom surface of the mobility and a lower end of a wheel of the mobility; or a special terrain includes terrain features for which the mobility is capable of moving based on one of or both of an entry direction and a speed of the mobility.

3. The method of claim 2, wherein generating a vector map corresponding to the surrounding terrain includes:

collecting performance information of the mobility, calculating the vector map of the obstacle, calculating the vector map of the special terrain, and calculating the vector map of the general terrain.

4. The method of claim 3, wherein converting the vector map to a second score map includes:

assigning a first score based on the obstacle, assigning a second score based on maximum speed, and assigning a third score based on the special terrain.

5. The method of claim 4, wherein, in the assigning the first score based on the obstacle, the first score indicating movement prohibition is assigned to the cell including the obstacle, and the first score is assigned to the surrounding cell in inverse proportion to a distance to the obstacle.

6. The method of claim 4, wherein, in the assigning the second score based on the maximum speed, the second score is assigned based on a rate of the maximum speed being limited.

7. The method of claim 4, wherein the generating of the final score map based on the first score map and the second score map includes:

setting a first maximum value among at least one score assigned to any cell as the final score map of the corresponding cell, and setting a second maximum value among at least one score assigned to any vector as the final score map of the corresponding vector.

8. A method of controlling driving for a mobility, the method comprising:

generating a score map by the method, wherein the generating of the score map includes:

loading a local map including a plurality of cells, scanning a surrounding environment of the mobility, recognizing a surrounding terrain of the mobility from information on the surrounding environment of the mobility, generating a first score map corresponding to the surrounding terrain, generating a vector map, based on the surrounding terrain, that comprises a minimum and a maximum speed for the mobility, converting the vector map to a second score map, and generating a final score map based on the first score map and the second score map;

generating a driving route based on the score map;

generating a driving instruction based on the driving route; and controlling the driving of the mobility based on the generated driving instruction.

9. The method of claim 8, wherein the generating the driving route comprises:

generating at least one route from a current location of the mobility to a destination;

removing an inappropriate route including a zone where an obstacle is located or a movement of the mobility is prohibited from the at least one route; and selecting one, as the driving route, of the at least one route having a minimum score among the at least one route from which the inappropriate route is removed.

10. The method of claim 8, wherein the driving instruction includes a speed instruction and a torque instruction.

11. A system of controlling driving for a mobility, the system comprising:

a mobility;

a surrounding environment scanner mounted on the mobility and configured to scan a surrounding environment of the mobility;

one or more processors; and a storage medium storing computer-readable instructions that, when executed by the one or more processors, enable the one or more processors to:

load a local map including a first plurality of cells, receive information on the scanned surrounding environment from the surrounding environment scanner, recognize a surrounding terrain of the mobility from information on the surrounding environment, generate a first score map corresponding to the recognized surrounding terrain, generate a vector map based on the recognized surrounding terrain, that comprises a minimum and a maximum speed for the mobility, convert the generated vector map to a second score map, generate a final score map based on the first score map and the second score map, and generate a driving route based on the final score map, and control the driving of the mobility based on the driving route.

12. The system of claim 11, wherein the surrounding terrain includes:

an obstacle includes an object physically existing between a bottom surface of the mobility and a top surface of the mobility;

a general terrain includes terrain surfaces existing between the bottom surface of the mobility and a lower end of a wheel of the mobility; or a special terrain includes terrain features for which the mobility is capable of moving based on one of or both of an entry direction and a speed of the mobility.

13. The system of claim 12, wherein the vector map includes a second plurality of cells that each correspond to one of the first plurality of cells and a plurality of vectors each heading from each of the second plurality of cells to a surrounding cell, each cell storing a terrain type and each vector storing maximum and minimum speeds of the mobility when the mobility moves in a direction of the vector, and wherein, for the generating of the vector map based on the surrounding terrain, the instructions further enable the one or more processors to:

collect performance information of the mobility, calculate the vector map of the obstacle based on an obstacle type, calculate the vector map of the special terrain based on a special terrain type and the performance information of the mobility, and calculate the vector map of the general terrain based on a general terrain type and the performance information of the mobility.

14. The system of claim 13, wherein, for the converting of the vector map to the second score map, the instructions further enable the one or more processors to:

assign a first score, based on the obstacle, that indicates a movement prohibition, assign a second score based on maximum speed, and assign a third score based on the special terrain.

15. The system of claim 14, wherein the instructions further enable the one or more processors to assign the first score based on the obstacle by assigning the first score indicating movement prohibition to the cell including the obstacle and assigning the first score to the surrounding cell in inverse proportion to a distance to the obstacle.

16. The system of claim 14, wherein the instructions further enable the one or more processors to assign the second score based on the maximum speed by assigning the second score based on a rate of the maximum speed being limited.

17. The system of claim 14, wherein, for the generating of the final score map based on the first score map and the second score map, the instructions further enable the one or more processors to:

set a first maximum value among at least one score assigned to any cell as a final score of the corresponding cell, and set a second maximum value among at least one score assigned to any vector as a final score of the corresponding vector.

18. The system of claim 11, wherein, for the generating of the driving route, the instructions further enable the one or more processors to:

generate at least one route from a current location of the mobility to a destination, remove an inappropriate route including a zone where an obstacle is located or a movement of the mobility is prohibited from the at least one route, and select one, as the driving route, of the at least one route having a minimum score among the at least one route from which the inappropriate route is removed.

19. The system of claim 11, wherein, for the controlling of the driving of the mobility based on the driving route, the instructions further enable the one or more processors to:

generate a driving instruction based on the driving route, and control the driving of the mobility based on the generated driving instruction.

20. The system of claim 19, wherein the driving instruction includes a speed instruction and a torque instruction.

* * * * *